United States Patent
Forte et al.

(10) Patent No.: US 11,738,855 B2
(45) Date of Patent: Aug. 29, 2023

(54) SYSTEM AND METHOD FOR PROPELLER RESPONSE ENHANCEMENT DURING TRANSITION FROM GROUND TO FLIGHT CONFIGURATION FOR A TURBOPROPELLER ENGINE

(71) Applicant: GE Avio S.r.l., Rivalta di Torino (IT)

(72) Inventors: Pierpaolo Forte, Rivalta di Torino (IT); Stefano Ettorre, Bari (IT); Giuseppe Donini, Rivalta di Torino (IT)

(73) Assignee: GE Avio S.r.l., Rivalta di Torino (IT)

( * ) Notice: Subject to any disclaimer, the term of this patent is extended or adjusted under 35 U.S.C. 154(b) by 0 days.

(21) Appl. No.: 16/982,312

(22) PCT Filed: Mar. 22, 2019

(86) PCT No.: PCT/EP2019/057342
§ 371 (c)(1),
(2) Date: Sep. 18, 2020

(87) PCT Pub. No.: WO2019/180260
PCT Pub. Date: Sep. 26, 2019

(65) Prior Publication Data
US 2021/0009252 A1    Jan. 14, 2021

(30) Foreign Application Priority Data
Mar. 23, 2018  (EP) .................................... 18425018

(51) Int. Cl.
*B64C 11/30* (2006.01)
*B64D 31/06* (2006.01)

(52) U.S. Cl.
CPC ............ *B64C 11/305* (2013.01); *B64D 31/06* (2013.01)

(58) Field of Classification Search
CPC ... B64C 11/305; B64C 11/325; B64C 11/385; B64C 11/30; B64C 27/68; B64D 31/02;
(Continued)

(56) References Cited

U.S. PATENT DOCUMENTS 2,655,999 A * 10/1953 Sidney ................... B63H 3/082
                                                         416/154
2,913,056 A    11/1959 Farkas
(Continued)

FOREIGN PATENT DOCUMENTS

CN        104656660 A    5/2015
GB           614951 A   12/1948
(Continued)

OTHER PUBLICATIONS

NASA Official: Nancy Hall, May 5, 2015, NASA, Glenn Research Center, pp. 1-2 (Year: 2015).*
(Continued)

*Primary Examiner* — Timothy D Collins
*Assistant Examiner* — Terri L Filosi
(74) *Attorney, Agent, or Firm* — Dority & Manning, P.A.

(57) ABSTRACT

An electronic control system for a turbopropeller engine having a gas turbine and a propeller assembly coupled to the gas turbine is provided. The control system implements a propeller control unit to control propeller operation using an actuation assembly designed to adjust a pitch angle of propeller blades. The control unit engages a mechanical lock determining a minimum flight value for the pitch angle during a flight operating mode, and disengages the mechanical lock and controls the pitch angle below the minimum flight value, up to a minimum ground value lower than the minimum flight value, during a ground operating mode. The propeller control unit, during a transition from the ground operating mode to the flight operating mode, engages the
(Continued)

mechanical lock. The control unit anticipates the increase of the pitch angle before the mechanical lock engagement when transitioning from the ground operating mode to the flight operating mode.

17 Claims, 6 Drawing Sheets

(58) Field of Classification Search
CPC ... B64D 31/06; F01D 7/00; F01D 7/02; F02C 6/206; F05D 2260/70–79
See application file for complete search history.

(56) References Cited

U.S. PATENT DOCUMENTS

| | | | |
|---|---|---|---|
| 5,005,354 A | 4/1991 | Schneider | |
| 5,029,091 A | 7/1991 | Schneider et al. | |
| 5,331,559 A | 7/1994 | High et al. | |
| 8,109,728 B2 | 2/2012 | Neitzke et al. | |
| 8,186,629 B2 | 5/2012 | Queiras et al. | |
| 11,312,476 B2 * | 4/2022 | Hoemke | B64C 11/303 |
| 2008/0075591 A1 * | 3/2008 | Builta | G05D 1/0202 |
| | | | 416/1 |
| 2008/0169379 A1 * | 7/2008 | Cotton | B64C 27/10 |
| | | | 244/60 |
| 2016/0229547 A1 * | 8/2016 | Fisher | B64C 11/303 |

FOREIGN PATENT DOCUMENTS

| | | | | |
|---|---|---|---|---|
| GB | 691755 A | 5/1953 | | |
| GB | 816870 A | 7/1959 | | |
| RU | 2550887 C2 * | 5/2015 | | B64D 43/00 |

OTHER PUBLICATIONS

PCT International Search Report Corresponding to PCT/EP2019/057342 dated Jun. 24, 2019.

* cited by examiner

SYSTEM AND METHOD FOR PROPELLER RESPONSE ENHANCEMENT DURING TRANSITION FROM GROUND TO FLIGHT CONFIGURATION FOR A TURBOPROPELLER ENGINE

CROSS-REFERENCE TO RELATED APPLICATIONS

This Patent application claims priority from European Patent Application No. 18425018.1 filed on Mar. 3, 2018, the disclosure of which is incorporated by reference.

TECHNICAL FIELD

The present solution relates to a system and method for propeller response enhancement during transition from ground to flight configuration for a turbopropeller (or turboprop) engine of an aircraft.

BACKGROUND ART

As it is known, a turbopropeller engine includes a gas turbine and a propeller assembly, coupled to the gas turbine via a gearbox assembly.

Aircraft solutions are known, in which a single operator-manipulated input device (a power, or throttle, lever) is used by the pilot to input an engine power request; the same input device is also used to determine a propeller pitch angle or setting.

Propeller control is generally based on a closed-loop tracking of propeller speed and/or propeller pitch references, taking into account operating and environmental conditions and the input power request provided via the input device. The output of the control action is generally a driving quantity, e.g. an electric current, that is supplied to a propeller actuation assembly of the turbopropeller engine (e.g. to a servo-valve) to control the pitch angle of the propeller blades, in order to regulate the value of the propeller speed.

The propeller actuation assembly is generally provided with a safety passive device, a mechanical lock called "hydraulic lock", the aim of which is to limit the propeller pitch to a minimum value, so called "Min Flight Pitch (MFP)", during flight operations. Regardless how the pitch is commanded by the propeller control system, if the hydraulic lock is engaged, the pitch will never fall below the MFP value.

Running the propeller with pitch below the MFP during takeoff or flight operations is indeed classified as hazardous/catastrophic, since it could cause propeller overspeed and/or excessive drag, leading to inability to control the aircraft (this being particularly true in case of twin engine applications). In the worst case, if the pitch falls below the "flat pitch", it will cause thrust acting in the opposite direction (reverse thrust).

In most of the known turbopropeller engines, only a single engine idle setting is therefore available, with minimum propeller pitch at the MFP value, both during flight operating conditions and during ground operations, such as taxiing and holding.

However, the MFP idle setting generally delivers more thrust than what would be required during the ground operations, thereby increasing brake usage and fuel consumption and entailing a high pilot workload.

In general, ground operations like taxiing and holding would be optimized from the pilot workload and efficiency standpoint, if the propeller were able to operate below the MFP setting.

In order to address this issue, European patent application 17425083.7 filed on Jul. 28, 2017 in the name of the present Applicant, discloses a propeller control system wherein, during ground operations, the propeller pitch may be limited via software to a "Min Ground Pitch (MGP)" value, that is lower than the MFP value, with the hydraulic lock being disengaged. In particular, the above patent application discloses how the MGP and the MFP are selected, depending on the flight or ground operating conditions, as determined via suitable sensors, e.g. a WoW (Weight on Wheels) sensor.

Due to the possibility of disengaging the hydraulic lock by the control system, the pitch can be modulated over its entire range, from a maximum value (a so called "full feather" value, with minimum air resistance) down to a minimum value (a so called "full reverse" value), lower than the MFP value.

In particular, pitch modulation from the MFP to the maximum, or full feather, value is implemented by the control system via modulation of a flow of pressurized oil into a first chamber, the so called "Flight Gallery", of the propeller actuation assembly; while pitch modulation below the MFP value, down to the minimum, or full reverse, value is implemented by the control system by modulating the flow of pressurized oil into a second chamber, the so-called "Ground Gallery", of the same actuation assembly, with the Flight Gallery being completely filled. When the hydraulic lock is engaged, the oil flow is prevented to reach the ground gallery, which has to be preemptively fully emptied.

The solution disclosed in the above patent application advantageously allows to improve ground operation of the aircraft, mitigate operation of the propeller in an avoid band, improve fuel consumption and generally improve operation of the aircraft and turbopropeller engine.

However, the present Applicant has realized that the above solution may not provide a desired propeller response during a transition from the "ground" configuration (with hydraulic lock disengaged) to the "flight" configuration (with hydraulic lock engaged).

The transition from the "ground" configuration to the "flight" configuration indeed requires preemptive full emptying of the ground gallery of the propeller actuation assembly. This operation is performed slowly, once the hydraulic lock is engaged, and it is independent from the control system operation, i.e. no pitch modulation is possible during this phase: the pitch will slowly drift from its current value to the MFP value, independently from the control action. Slowness of this operation is required by design, in order to cope with inadvertent hydraulic lock engagement during reverse operations: in that case, it is preferable that the pitch slowly drifts toward MFP, because this will cause thrust inversion (from reverse to forward) and the control system and the pilot will have enough time to reduce the power in order to not fall into a "significant thrust in the opposite direction" scenario.

When the hydraulic lock is engaged, the control system thus temporary loses the ability to modulate the pitch, until the ground gallery is fully emptied; when the control system is again able to modulate the pitch, the engine power may be so high that the pitch is required to be increased too fast with respect to the system capability, in order to match the propeller speed with its desired value. This could lead to propeller overspeed or, in a worst case scenario, to a power turbine overspeed, leading to a protective engine shutdown.

Figure 1:
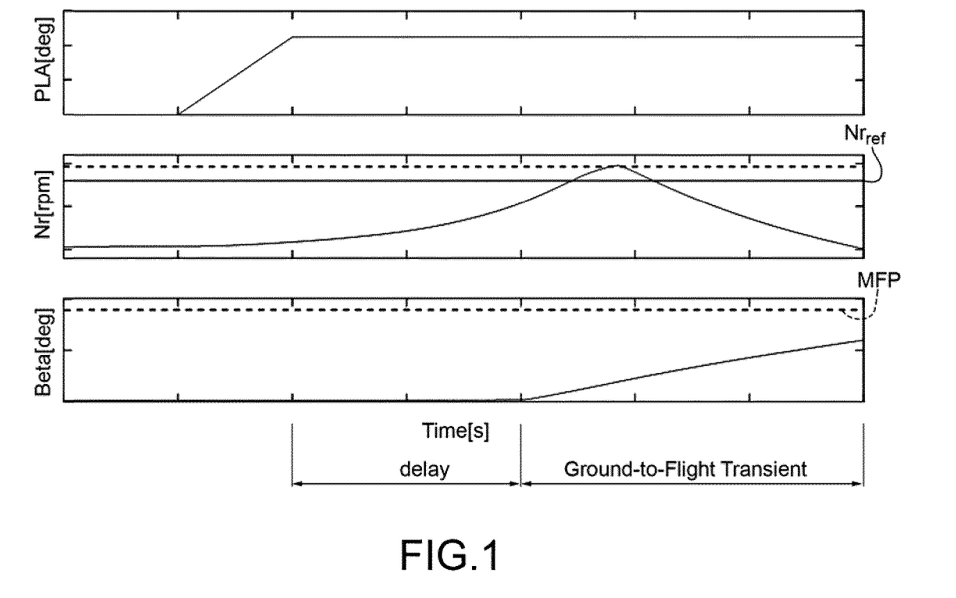
FIG. 1 is a plot of quantities related to propeller operation during a transition from ground to flight configuration, relating to a known control solution for a turbopropeller engine.

This situation is depicted in FIG. 1, which shows the plots vs time of: a PLA signal, representing an input power request by the pilot, based on the positioning angle of a single operator-manipulated input device; the propeller speed Nr; and the pitch angle β of the propeller blades.

During ground operations, the propeller speed Nr is due to the current engine power and the MGP value: the speed reference $Nr_{ref}$ is generally higher than the one achievable at idle, so the propeller control system will try to reduce the pitch to increase the propeller speed, in order to match the speed reference; since the pitch is limited to the MGP, the resulting speed is sensibly lower than the reference.

When the pilot moves the power lever to the takeoff position, the control system will engage the hydraulic lock, after a delay interval, e.g. of some seconds. This delay interval is due to a requirement to "validate" the takeoff request, i.e. it may define a period of time required to ensure that a command is intentional (in other words, the delay ensures that a command to TAKEOFF is actually desired rather than unintentional); it should be appreciated that the duration of this time interval may be dependent at least on the type, function, usage or mission, of the aircraft.

During the engine acceleration to the takeoff power, the propeller is accelerated and the propeller control system will try to keep the pitch as low as possible, to quickly reach the speed reference $Nr_{ref}$.

As discussed above, when the hydraulic lock is engaged, the control system temporary loses the ability to modulate the pitch, until the ground gallery is fully emptied; this occurs during a time interval denoted as "ground-to flight (G2F) transient". During this time interval, due to the slow drift of the pitch towards the MFP value and the inability of the control system to modulate the pitch, propeller overspeed may occur (as shown in the exemplary plot, where overspeed is so high that it causes engine shutdown protection).

However, as discussed above, propeller overspeed should be avoided, being potentially dangerous for the aircraft operation.

DISCLOSURE OF INVENTION

The aim of the present solution is to provide an improved control solution for the turbopropeller engine, allowing to achieve an enhanced propeller response during a transition from ground to flight configuration, which may avoid the occurrence of propeller overspeed and, in the worst case, of engine shut-down.

According to the present solution, a control system and a control method are therefore provided, as defined in the appended claims.

BRIEF DESCRIPTION OF THE DRAWINGS

For a better understanding of the present invention, preferred embodiments thereof are now described, purely as non-limiting examples, with reference to the attached drawings, wherein.

BEST MODE FOR CARRYING OUT THE INVENTION

Figure 2:
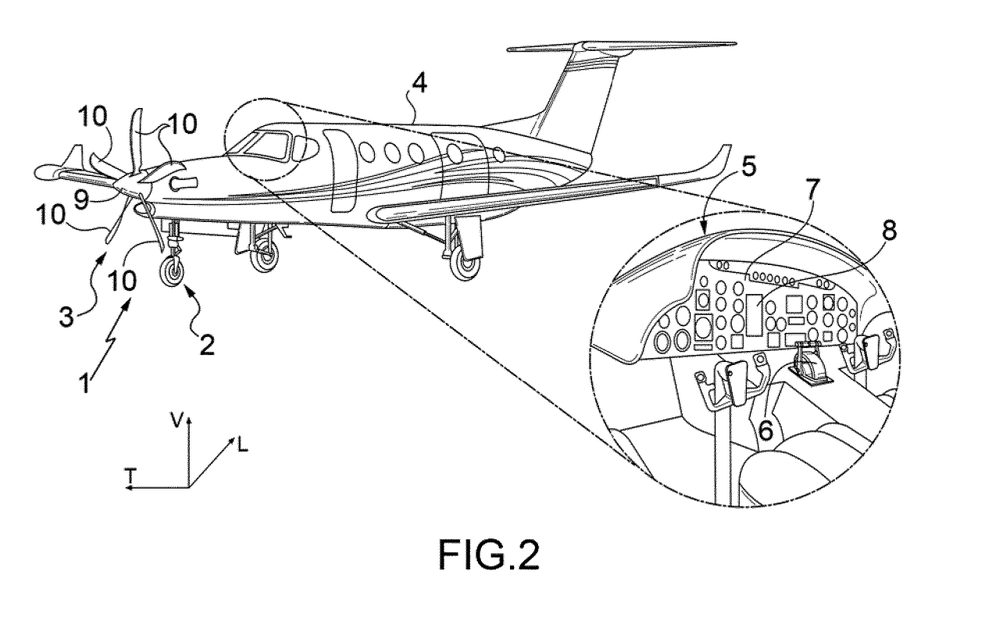
FIG. 2 is a perspective view of an aircraft provided with a turbopropeller engine.

FIG. 2 shows a perspective view of an exemplary aircraft 1, provided with a turbopropeller engine 2; only a propeller assembly 3 of the turbopropeller engine 2 is visible in the same FIG. 2.

The aircraft 1 includes an airframe 4 defining a cockpit 5; a single operator-manipulated input device (a power, or throttle, lever) 6 and an instrument control panel 7 having a display 8 are provided within the cockpit 5.

The propeller assembly 3 comprises a hub 9 and a plurality of blades 10 extending outwardly from the hub 9. A gas turbine of the turbopropeller engine 2 (here not shown) generates and transmits power to drive rotation of propeller assembly 3, thus generating thrust for the aircraft 1.

The aircraft 1 defines an orthogonal coordinate system, including three orthogonal coordinate axes. In particular, the three orthogonal coordinate axes include a lateral axis L, a longitudinal axis T, and a vertical axis V. During operation, the aircraft 10 can move along at least one of the lateral axis L, the longitudinal axis T, and the vertical axis V; in particular, forward and reverse operating modes of the aircraft 1 imply movement in respective, and opposing, directions along the longitudinal axis T.

Figure 3:
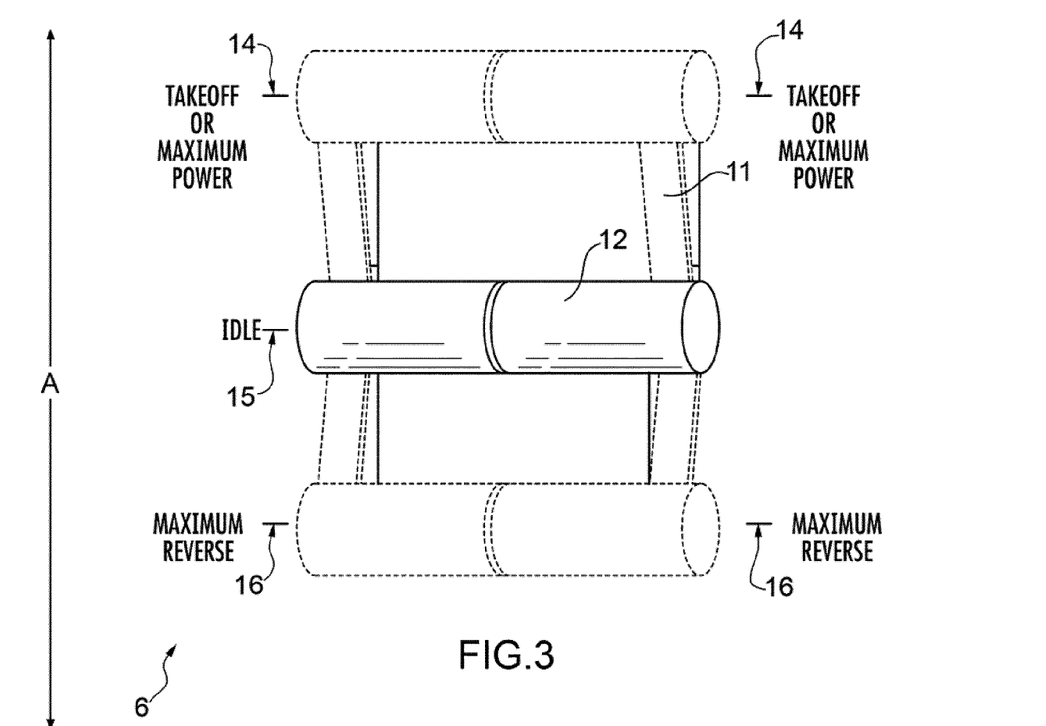
FIG. 3 is a schematic view of an operator input device of the aircraft.

FIG. 3 shows the operator-manipulated input device 6, used by the pilot of the aircraft 1 to control engine power; additionally, the operator-manipulated input device 6 controls a minimum propeller pitch angle or low pitch setting (LPS) based on a position thereof.

In the embodiment depicted, the operator-manipulated input device 6 defines an axial direction A, and includes a lever 11 having a handle 12. The lever 11 is movable along the axial direction A between a first position 14, corresponding to a TAKEOFF or MAXIMUM POWER setting, and a second position 16, corresponding to a MAXIMUM REVERSE setting. Accordingly, moving the lever 11 towards the first position 14 increases thrust of the aircraft 1 in a first direction along the longitudinal axis T, whereas moving the lever 11 towards the second position 16 increases thrust of the aircraft 1 in a second direction along the same longitudinal axis T, opposite to the first direction. In addition, the lever 11 includes one or more of intermediate third positions 15 disposed between the first and second positions 14, 16; in particular, the intermediate third positions 15 can include an IDLE position.

With the single operator-manipulated input device 6, the pilot may set at a same time torque (or thrust) and speed requirements. The propeller speed demand or reference $Nr_{ref}$ is a function of the lever angular position (or level angle, LA), according to a predetermined schedule being developed to operate the propeller as close as possible to an optimal operating point, assuming a typical aircraft mission.

Figure 4:
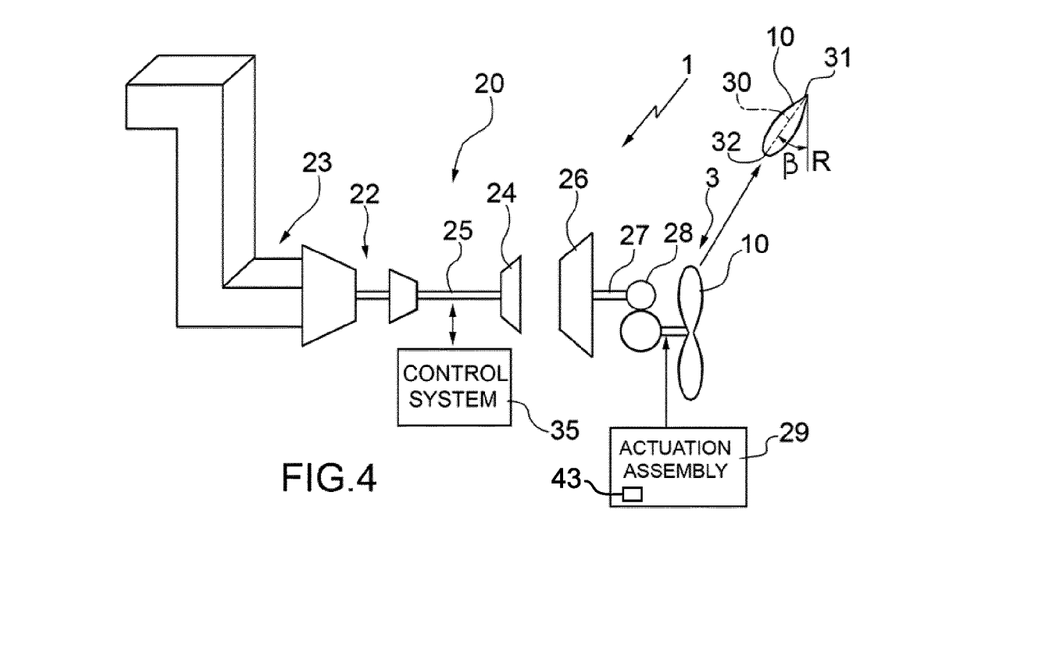
FIG. 4 is a schematic block diagram of the turbopropeller engine of the aircraft.

As schematically shown in FIG. 4, the gas turbine of the turbopropeller engine 2, here denoted with 20, generally comprises:

axial/centrifugal compressors 22, coupled to an air intake 23;

a high-pressure turbine 24, so called "gas generator", coupled to the axial/centrifugal compressors 22 via a gas generator shaft 25; and a low-pressure turbine 26, so called "power turbine", mechanically decoupled from the gas generator shaft 25 and driven by hot gas expansion.

The propeller assembly 3 is coupled to the gas turbine 20 via a power, or propeller, shaft 27 and a gearbox 28.

An actuation assembly 29 is coupled to the propeller assembly 3, to control pitch angle β of the propeller blades 10, in order to regulate the value of the propeller speed Nr; as shown in the same FIG. 4, the pitch angle β may be defined as the angle between a chord 30 extending between leading and trailing edges 31, 32 of each propeller blade 10 and a direction R about which the propeller blades 10 are rotatable. The actuation assembly 29 includes a mechanical lock 43, also noted herein as a hydraulic lock.

Figure 5A:
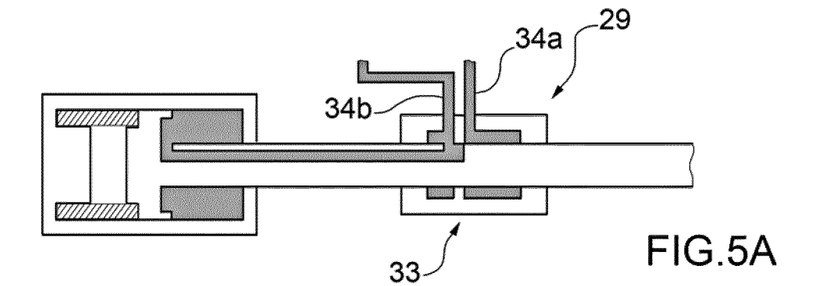
FIGS. 5A and 5B are schematic cross-sections of an actuation assembly for adjusting propeller pitch, in different operating conditions.
Figure 5B:
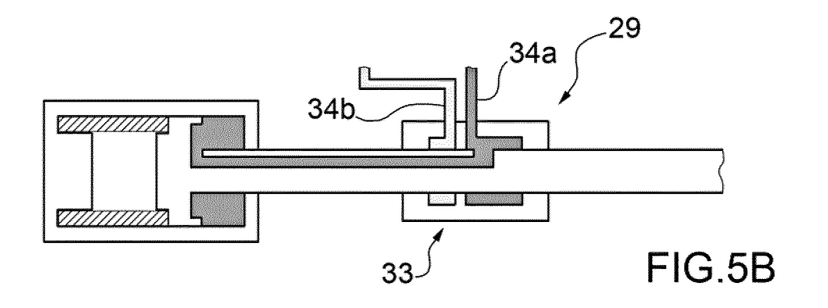

As previously discussed, and as shown schematically in FIGS. 5A and 5B, the actuation assembly 29 includes a servovalve arrangement 33 with a first chamber 34a, the so called "Flight Gallery", and a second chamber 34b, the so called "Ground Gallery"; modulation of a flow of pressurized oil into the first or second chamber 34a, 34b allows modification of the pitch angle β.

FIG. 5A shows a configuration in which the Flight Gallery is fully filled with the pressurized oil, and oil flow to the Ground Gallery is modulated to control the pitch value below the MFP value, with the hydraulic lock being disengaged; whereas FIG. 5B shows a further configuration, with empty Ground Gallery and hydraulic lock engaged, for operations above the MFP value.

The turbopropeller engine 2 is managed by an automatic electronic control system 35 (shown schematically in FIG. 4), that includes an electronic processing unit (e.g. a microprocessor, a microcontroller, or similar processing unit) provided with a non-volatile memory storing suitable software instructions, in order to implement an engine control strategy to meet an input power demand, originated from the operator-manipulated input device 6. The electronic control system 35 may define one or more of a full authority digital engine controller (FADEC), an engine control unit (ECU), or an electronic engine control (EEC); in particular, according to an embodiment of the present solution, the electronic control system 35 defines a propeller electronic control unit (PEC).

As will be discussed in more details in the following, according to a particular aspect of the present solution, the electronic control system 35 is configured to anticipate the pitch increase associated with the transition from ground to flight configurations, upon a takeoff request input by the pilot through the operator-manipulated input device 6 (e.g. moving the lever 11 up to the TAKEOFF or MAXIMUM POWER setting). The pitch increase anticipation is actually performed before the takeoff command issued by the pilot is validated, in particular during a delay or validation time T (e.g. of a 2 s duration) required to "validate" the takeoff request.

The pitch increase anticipation allows to override the propeller speed control, and to start emptying the ground gallery 34b of the propeller actuation assembly 29; this results in reduced propeller acceleration and, more importantly, in a shortened ground-to-flight transition time up to the moment when the hydraulic lock is engaged and the propeller speed control is resumed.

Figure 6:
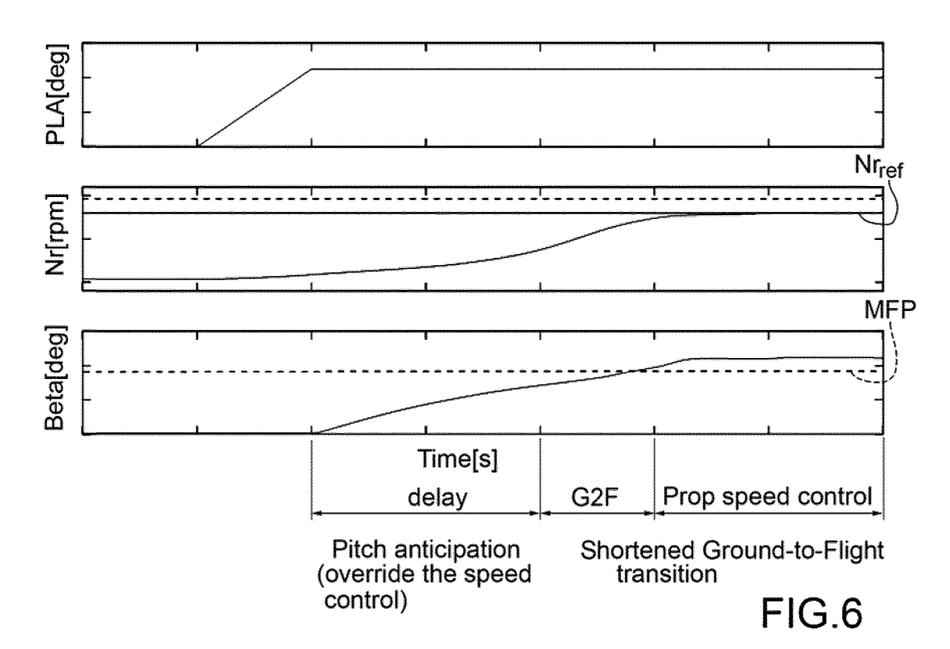
FIG. 6 is a plot of quantities related to propeller operation during a transition from ground to flight configuration, according to an embodiment of the present disclosure.

As shown in FIG. 6 (which may conveniently be compared to FIG. 1), pitch increase anticipation before takeoff validation allows to greatly shorten the ground-to-flight transition time and to achieve a smoother propeller control during the takeoff fast acceleration, with no propeller overspeed occurring; when propeller speed control resumes operation, after the ground-to-flight transition, the pitch angle reference is set slightly above the MFP value.

Figure 7:
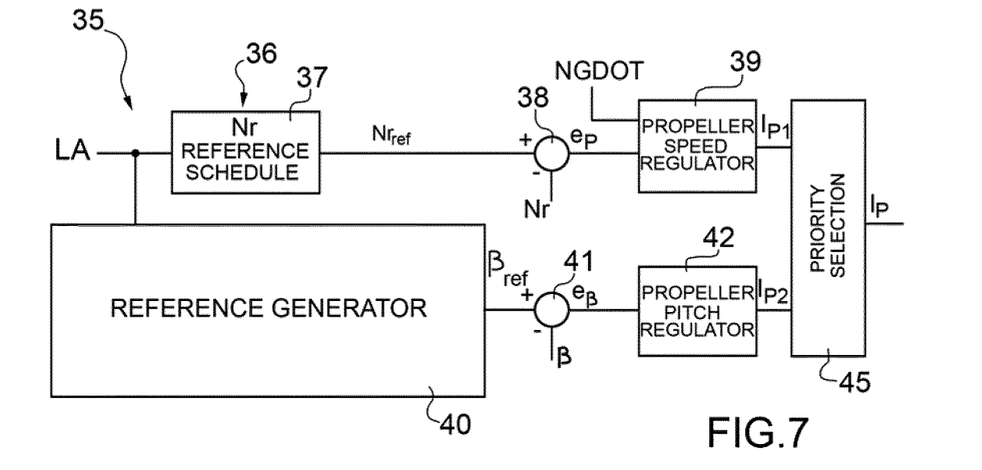
FIG. 7 is a schematic block diagram of a control system of the turbopropeller engine, according to an embodiment of the present disclosure.

With reference to FIG. 7, a possible implementation of the electronic control system 35 of the turbopropeller engine 2 is now discussed in more detail.

Electronic control system 35, implementing the propeller electronic control unit (PEC) to adjust propeller blade pitch angle β to control the propeller speed Nr, comprises:

a first reference generator 36, including a first scheduler 37 configured to receive the lever angle signal LA indicative of the input power request, in particular indicative of the positioning angle of the operator-manipulated input device 6, and to determine a value of a reference propeller speed $Nr_{ref}$ corresponding to the positioning angle of the lever 11, according to a preset schedule that characterizes turbopropeller engine operation (e.g. provided by the manufacturer and stored in the non-volatile memory of the processing unit of the electronic control system 35);

a first adder block 38, receiving at a first (positive, or summation) input the reference propeller speed $Nr_{ref}$ and at a second (negative, or subtraction) input a measured propeller speed Nr, as a feedback, measured by a suitable sensor coupled to the turbopropeller engine 2, and providing at the output a propeller speed error $e_p$, as a function of the subtraction between the reference propeller speed $Nr_{ref}$ and the measured propeller speed Nr; and a first regulator 39, receiving at its input the propeller speed error $e_p$ and an acceleration/deceleration of the gas generator (the so called "Ngdot" quantity), and generating at its output, based on a regulation scheme aimed at minimizing the same propeller speed error $e_p$, a first driving quantity $I_{P1}$, for example an electrical current.

The electronic control system 35 thus implements a closed loop control, aimed at controlling the propeller speed Nr based on a scheduled reference and a feedback quantity.

Electronic control system 35 moreover comprises:

a second reference generator 40, configured to receive the signal LA indicative of the input power request and to determine a value of a pitch angle reference βref;

a second adder block 41, receiving at a first (positive, or summation) input the pitch angle reference βref and at a second (negative, or subtraction) input a measured pitch angle β, as a feedback, measured by a suitable sensor coupled to the turbopropeller engine 2, and providing at the output a pitch angle error $e_β$, as a function of the subtraction between the pitch angle reference βref and the measured pitch angle β; and a second regulator 42, receiving at its input the pitch angle error $e_β$ and generating at its output, based on a regulation scheme aimed at minimizing the same pitch angle error $e_\beta$, a second driving quantity $I_{P2}$, for example an electrical current.

The electronic control system 35 thus implements a further closed loop control, aimed at controlling the pitch angle β based on a scheduled reference and a feedback quantity.

The electronic control system 35 moreover comprises a priority selection stage 45, coupled to the first and second regulators 39, 42 to receive the first and second driving quantity $I_{P1}$, $I_{P2}$, and configured to implement a priority selection scheme to provide at the output an actuator driving quantity $I_p$, e.g. an electric current, based on the first and second driving quantity $I_{P1}$, $I_{P2}$, that is to be supplied to the actuation assembly 29 of the turbopropeller engine 2 to control the pitch angle β of the propeller blades 10, in order to regulate the value of the propeller speed Nr.

The priority selection stage 45 may implement a minimum (min) or maximum (max) selection between the first and second driving quantities $I_{P1}$, $I_{P2}$. In a possible embodiment, the priority selection stage 45 implements a minimum selection, and a positive actuator driving quantity $I_P$ determines a decrease of the pitch angle β and an increase in the propeller speed Nr; in an alternative embodiment, the priority selection stage 45 may implement a maximum selection, and a positive actuator driving quantity $I_P$ may determine an increase of the pitch angle β and a decrease in the propeller speed Nr.

According to an aspect of the present solution, the priority selection between the first (propeller speed) and the second (propeller pitch) closed-loop controls is exploited to implement the above discussed pitch increase anticipation.

In particular, in the transition from ground to flight, and before takeoff, the pitch control will have authority on the propeller speed control (due to selection by the priority selection stage 45); an aspect of the present solution thus envisages to properly modify the pitch request, i.e. the pitch angle reference βref generated by the second reference generator 40, to cause the increase of the pitch angle β during the engine acceleration.

Figure 8:
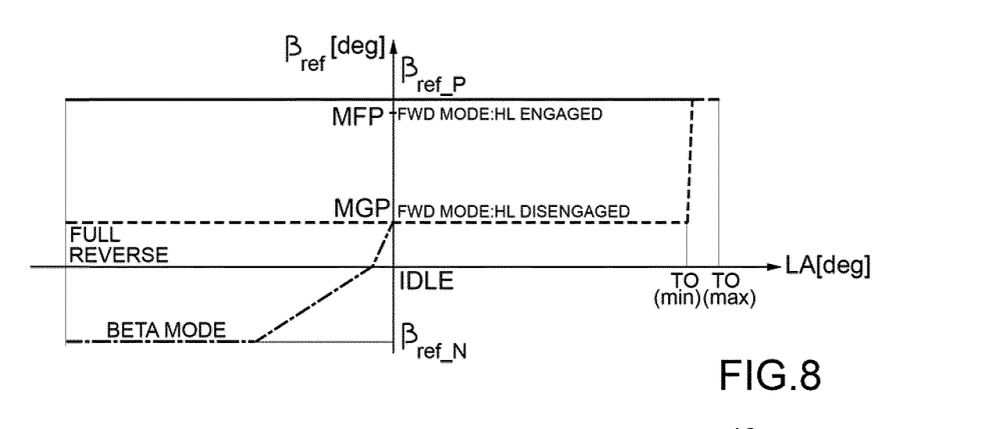
FIG. 8 depicts plots of a pitch angle reference $β_{ref}$ used in the control system of FIG. 7.

FIG. 8 depicts the pitch angle reference βref generated by the second reference generator 40 versus the lever angle LA with respect to three different possible operating modes, including: a first mode, i.e. a forward mode with hydraulic lock engaged (HL ENGAGED); a second mode, i.e. a forward mode with hydraulic lock disengaged (HL DISENGAGED); and a third mode, i.e. a reverse, or beta, mode.

In more details, in the first operating mode, corresponding to a flight operating condition, the pitch angle reference βref is set at a positive value $\beta_{ref\_p}$ not lower than the MFP value, in the embodiment disclosed slightly above the MFP value, regardless of the lever angle LA. In this way, during flight, the pitch angle β is software limited above the MFP value; if the software control fails, the hydraulic lock will in any case prevent the pitch angle β from falling below the MFP value. This first operating mode is represented by the solid curve in FIG. 8.

In the second operating mode, corresponding to a ground operating condition, the pitch angle reference βref is set to the MGP value, lower than the MFP value, if the lever angle LA is below the takeoff value. When the lever angle LA is in a takeoff range (i.e. comprised between a minimum takeoff value $TO_{min}$ and a maximum takeoff value $TO_{max}$), the pitch angle reference βref is set to the positive value $\beta_{ref\_p}$, in this case higher than the MFP value, as in the first operating mode, thereby anticipating the pitch increase (and causing the start of the operation of emptying the ground gallery from the pressurized oil). This second operating mode is shown with a dashed curve in FIG. 8.

In the third operating mode, corresponding to a reverse operating condition, the pitch angle reference βref is scheduled according to the lever angle LA, from the MGP value to the full reverse value, i.e. a negative value $\beta_{ref\_p}$. In a known manner, reverse operating mode is not allowed when lever angle LA is at, or above, the idle position, or if conditions to switch from forward mode to reverse mode are not satisfied (in that case, if the lever angle LA is below the idle position, the pitch angle reference βref will be set to the MGP value). This third operating mode is represented by the dashed-and-dotted curve in FIG. 8.

Figure 9:
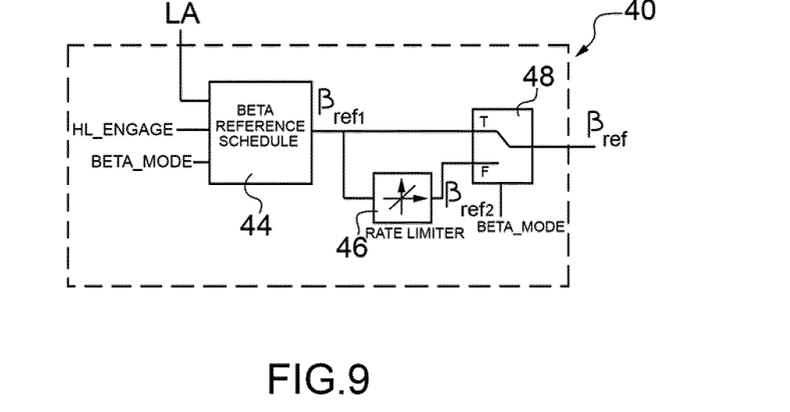
FIG. 9 is a schematic block diagram of a reference generator in the control system of FIG. 7.

A possible embodiment of the second reference generator 40 is now discussed in more details and with reference to FIG. 9.

The second reference generator 40 comprises a second scheduler 44 configured to receive the signal LA indicative of the input power request, in particular indicative of the positioning angle of the operator-manipulated input device 6, and to determine a first reference value $\beta_{ref1}$ for the pitch angle β, corresponding to the positioning angle of the lever 11, according to the above discussed three operating modes (as shown in the above discussed FIG. 8). In particular, the second scheduler 44 further receives at its input a first signal HL_ENGAGE, indicative of the engagement or disengagement of the hydraulic lock in the actuation assembly 29; and a second signal BETA_MODE, indicative of the active, or inactive, status of the reverse mode of operation of the aircraft 1.

According to a further aspect of the present solution, the second reference generator 40 further comprises a rate limiter 46, which is coupled to the output of the second scheduler 44 to receive the first reference value $\beta_{ref1}$, and is configured to implement a rate-limitation thereof (i.e. a limitation of the first derivative of the reference signal), thereby generating a second reference value $\beta_{ref2}$ for the pitch angle β.

The second reference generator 40 moreover comprises a switch selector 48, coupled to the second scheduler 44 and to the rate limiter 46 and configured to select at the output, as the pitch angle reference βref, either the first reference value $\beta_{ref1}$ or the second reference value $\beta_{ref2}$, based on the second signal BETA_MODE: in particular, the first reference value $\beta_{ref1}$ is selected if the reverse mode of operation is active (BETA_MODE is ON), and the second reference value $\beta_{ref2}$ (corresponding to a rate limitation) is instead selected if the reverse mode of operation is not active (BETA_MODE is OFF).

The rate limiter 46 is configured so that, when the pitch angle reference βref switches from the MGP value to the positive value $\beta_{ref\_p}$ slightly above the MFP value (during the above discussed second operating mode), the change is not applied suddenly (or step-like). The rate limiter 46 allows instead to smoothly increase the pitch angle reference βref upon the takeoff request (i.e. with a smooth increase rate).

This feature may be advantageous to avoid excessive pitch increase rate of change that could cause a propeller speed drop during the acceleration phase. The rate limiter effort may be automatically tuned according to environmental and engine conditions, in order to ensure a monotonic propeller speed increase. For example, a takeoff at altitude, or at higher temperatures, may require a lower pitch rate of change, because the engine available power is lower than at sea level conditions; in that case, the rate limiter 46 is configured to apply a softer rate of limitation, limiting the increasing load applied to the propeller shaft and thus avoiding propeller speed temporary drop during the acceleration phase.

Figure 10:
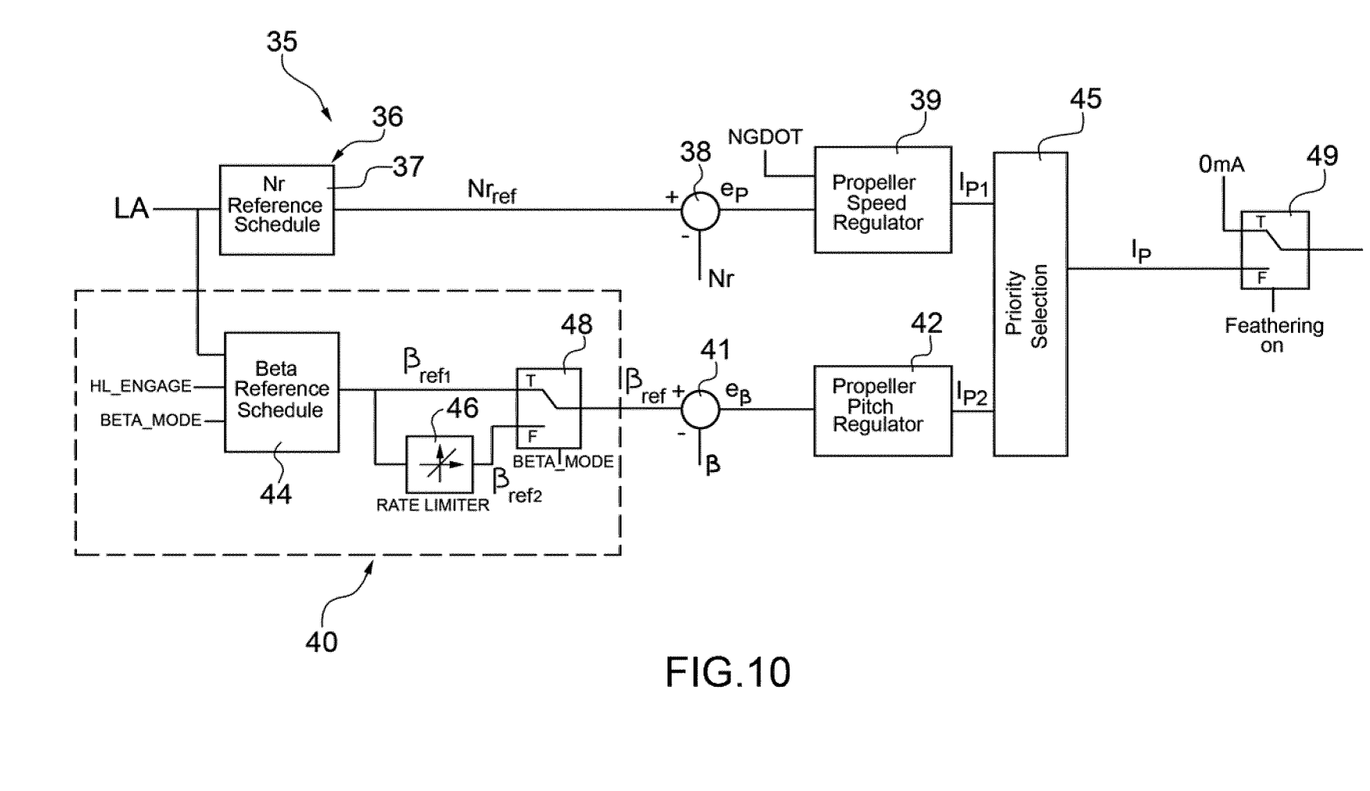
FIG. 10 is a schematic block diagram of the control system of the turbopropeller engine, according to a further embodiment of the present disclosure.

As shown in FIG. 10, according to another aspect of the present solution, the electronic control system 35 may further comprise a feathering switch 49, coupled to the output of the priority selection stage 45, and configured to provide, as the output driving quantity from the same electronic control system 35, either the actuator driving quantity $I_P$, during normal operating conditions, or a feathering current, e.g. equal to 0 mA, when a feathering request is active (as represented by a "Feathering ON" signal).

In particular, the feathering current provided to the actuation assembly 29 coupled to the propeller assembly 3, causes the propeller blades 10 to assume a feathering position (e.g. with a pitch angle β equal to 89°), with minimum resistance to the air flow.

Advantageously, the above discussed pitch anticipation enables the proper execution of a safety system called "autofeather". This function automatically feathers the propeller (via an independent valve), in case of an engine failure during takeoff or a rejected landing, and consists of fast pitch modulation to the feathering position. If the engine failure occurs during the ground-to-flight transition (early takeoff phase), the autofeather protection would indeed be ineffective without the pitch anticipation, because the propeller pitch would take too long to reach the feathering position.

Figure 11:
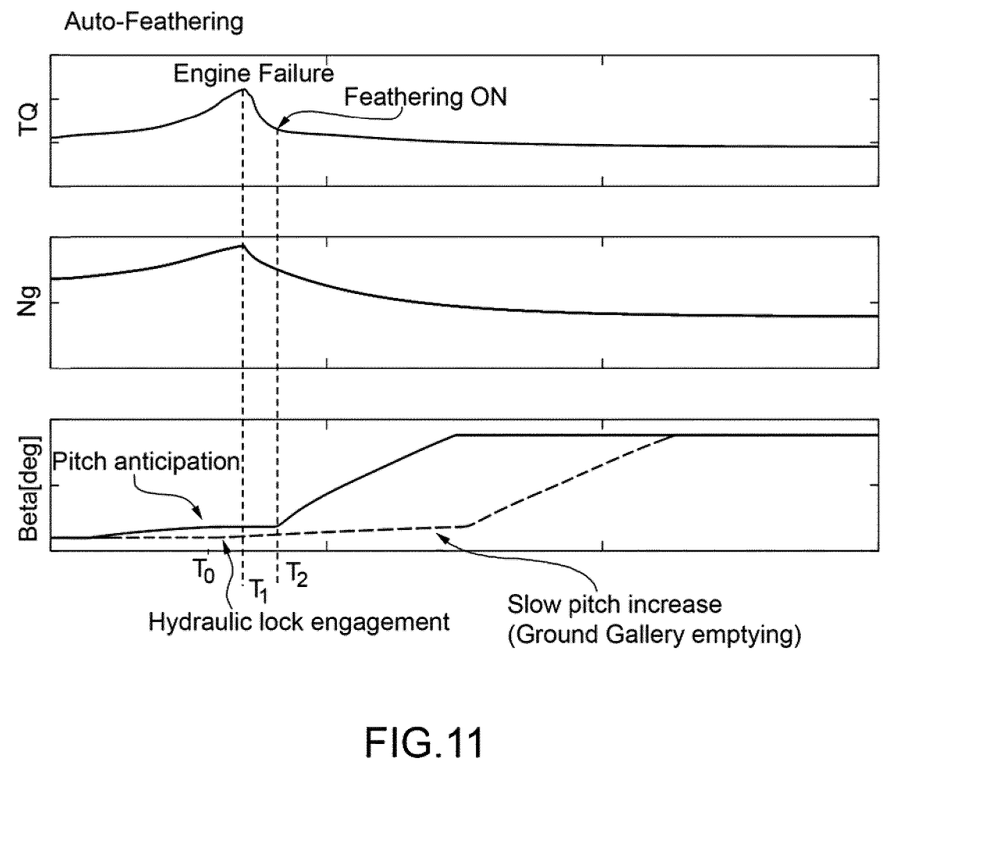
FIG. 11 is a plot of quantities related to propeller operation, during an auto-feathering operating mode.

By introducing the pitch anticipation, the autofeather function can instead be triggered with the required timing, as shown in FIG. 11.

In particular, FIG. 11 shows the plots of engine torque TQ and speed Ng during a fast acceleration before the takeoff: at time T0, the hydraulic lock is engaged; at time T1, the engine has a failure (see the reduction of the values of torque and speed due to the same engine failure); and at time T2 the autofeather protective function is activated.

FIG. 11 further shows the plot of the pitch angle β, in case of absence of the pitch anticipation according to the present solution (dashed line), and in case of the presence of the same pitch anticipation (continuous line). In particular, thanks to the pitch anticipation and the early emptying of the ground gallery of the pressurized oil, the electronic control system 35 is ready, upon the engine failure, to rapidly increase the pitch angle β up to the feathering position (e.g. β=89°); on the contrary, in case no pitch anticipation is provided (i.e. the present solution is not applied), a long time is required for the emptying of the ground gallery after the hydraulic lock is engaged, due to the slow pitch increase, so that there is a great delay to reach the feathering position.

The advantages of the present solution are clear from the previous discussion.

In particular, it is again underlined that the present solution allows to achieve an enhanced propeller response during ground to flight transitions, in particular avoiding propeller overspeed.

The proposed solution decouples the engine acceleration scheduling from the ground-to-flight responsiveness of the propeller control, allowing for fast engine accelerations without overspinning the propeller toward the protection limits.

The proposed solution also maintains the possibility of having slow transitions from ground to flight setting in case of failure, letting the pilot, or the control system, safely react, and, at the same time, allows commanded transitions to be fast enough to cope with performance and safety requirements.

As previously discussed, the proposed solution moreover allows for increased safety with respect to the application of the auto-feathering function.

Finally, it is clear that modifications and variations can be made to what is described and illustrated herein, without thereby departing from the scope of the present invention as defined in the appended claims.

In particular, it is underlined that, although generally provided to a fixed-wing aircraft, the present disclosure may further apply to rotary-wing aircraft, tilt-rotor aircraft, or other apparatuses including a pitch-changing propeller assembly and a gas generator coupled to the aircraft.

The invention claimed is:

1. An electronic control system for a turbopropeller engine having a gas turbine and a propeller assembly coupled to the gas turbine, the electronic control system comprising:
    a propeller control unit configured to control propeller operation based on a pilot input request, via generation of an actuator driving quantity for an actuation assembly designed to adjust a pitch angle of propeller blades of the propeller assembly; and
    an electronic processing unit configured to, in response to a takeoff input request to transition from a ground operating mode to a flight operating mode and preceding a validation of the takeoff input request:
    cause, prior to engagement of a mechanical lock and during engine acceleration to takeoff power, pressurized oil from a ground gallery of the pitch actuation assembly to start emptying so as to increase the pitch angle of the propeller blades towards a minimum flight pitch; and
    cause, prior to takeoff and to transition from the ground operating mode to the flight operating mode, engagement of the mechanical lock, the mechanical lock, when engaged, prevents the pitch angle from falling below the minimum flight pitch while in the flight operating mode.

2. The electronic control system according to claim 1, wherein the electronic processing unit is configured to cause pressurized oil from the ground gallery of the pitch actuation assembly to start emptying so as to increase the pitch angle of the propeller blades towards the minimum flight pitch in a time period following the takeoff input request and preceding the validation of the takeoff input request, and wherein the electronic processing unit is configured to cause engagement of the mechanical lock after the validation of the takeoff input request.

3. The electronic control system according to claim 1, wherein the takeoff input request is determined by actuation of an operator-manipulated input device towards a takeoff position.

4. The electronic control system according to claim 1, wherein the propeller control unit is configured to implement a pitch-angle closed control loop, the pitch-angle closed control loop comprising:
    a first reference generator, configured to determine a value of a reference pitch angle; and
    a first regulator, configured to generate a first control quantity based on an error between the reference pitch angle and a measured pitch angle, and
    wherein the first reference generator is configured to increase the reference pitch angle from a minimum ground value to a value not lower than a minimum flight value before engagement of the mechanical lock.

5. The electronic control system according to claim 4, wherein the electronic processing unit is configured to implement a propeller-speed closed control loop, the propeller-speed closed control loop comprising:
- a second reference generator, configured to determine a value of a reference propeller speed;
- a second regulator, configured to generate a second control quantity based on an error between the value of the reference propeller speed and a measured value of a propeller speed; and
- a priority selection stage, coupled to the first and second regulators to receive the generated first and second control quantities, and in implementing the priority selection stage, the electronic processing unit is configured to:
  - implement a priority selection scheme to select one of the generated first or second control quantities; and
  - provide, at its output, the actuator driving quantity that is supplied to the actuation assembly of the turbopropeller engine to control the pitch angle of the propeller blades, in order to regulate the measured value of the propeller speed.

6. The electronic control system according to claim 5, wherein in implementing the priority selection scheme, the electronic processing unit is further configured to:
- select one of the first or second control quantities generated by the pitch-angle closed control loop during the ground operating mode and the transition from the ground operating mode to the flight operating mode.

7. The electronic control system according to claim 4, wherein the first reference generator comprises:
- a scheduler configured to receive a signal indicative of an input power request and a further signal indicative of engagement, or disengagement, of the mechanical lock, and to determine a first reference value for the pitch angle; and
- a rate limiter, which is coupled to the output of the scheduler to receive the first reference value and is configured to implement a rate-limitation thereof, thereby generating a second reference value for the pitch angle, to be supplied as the reference pitch angle in at least one operating condition.

8. The electronic control system according to claim 7, wherein the rate limiter is automatically tuned according with environmental and/or engine conditions, including altitude and temperature, in order to ensure a monotonic propeller speed increase during the transition from the ground operating mode to the flight operating mode.

9. A turbopropeller engine for an aircraft, comprising:
a gas turbine; a propeller assembly, coupled to the gas turbine via a gearbox assembly; and
an electronic control system comprising:
a propeller control unit configured to control propeller operation based on a pilot input request, via generation of a driving quantity for an actuation assembly designed to adjust a pitch angle of propeller blades of the propeller assembly; and
an electronic processing unit configured to:
receive a takeoff input request to transition from a ground operating mode to a flight operating mode;
perform a takeoff validation to validate the takeoff input request is an intentional command; and
cause pressurized oil from a ground gallery of the actuation assembly to start being emptied so as to increase the pitch angle of the propeller blades towards a minimum flight pitch before the takeoff input request is validated during the takeoff validation.

10. The turbopropeller engine of claim 9, wherein the electronic processing unit is further configured to:
cause, after the takeoff input request is validated, engagement of a mechanical lock to further increase the pitch angle of the propeller blades towards the minimum flight pitch so as to continue emptying pressurized oil from the ground gallery of the pitch actuation assembly.

11. A control method for a turbopropeller engine having a gas turbine and a propeller assembly coupled to the gas turbine, the method comprising:
receiving a takeoff input request to transition from a ground operating mode to a flight operating mode, and preceding a validation of the takeoff input request after receiving the takeoff input request:
increasing, prior to engagement of a mechanical lock and during engine acceleration to takeoff power, a pitch angle of propeller blades of the propeller assembly towards a minimum flight pitch; and
engaging, prior to takeoff and to transition from the ground operating mode to the flight operating mode, the mechanical lock, the mechanical lock, when engaged, prevents the pitch angle from falling below the minimum flight pitch while in the flight operating mode.

12. The control method according to claim 11, further comprising:
performing the validation of the takeoff input request; and
wherein the increasing the pitch angle of the propeller blades towards the minimum flight pitch occurs in a time period following the takeoff input request and preceding the validation of the takeoff input request, and wherein the engaging of the mechanical lock occurs after the validation of the takeoff input request.

13. The control method according to claim 11, wherein the increasing of the pitch angle of propeller blades of the propeller assembly towards the minimum flight pitch comprises:
implementing a pitch-angle closed control loop, comprising:
determining a value of a reference pitch angle; and
generating a control quantity based on an error between the reference pitch angle and a measured pitch angle, and
wherein the determining comprises increasing the reference pitch angle from a minimum ground value to a value not lower than a minimum flight value before the mechanical lock engagement.

14. The control method according to claim 13, wherein increasing of the pitch angle of propeller blades of the propeller assembly towards the minimum flight pitch comprises:
implementing a propeller-speed closed control loop, comprising:
determining a value of a reference propeller speed;
generating a further control quantity based on an error between the reference propeller speed and a measured propeller speed; and
implementing a priority selection scheme between the generated control quantities to provide an actuator driving quantity that is supplied to an actuation assembly of the turbopropeller engine to control the pitch angle of the propeller blades.

15. The control method according to claim 14, wherein implementing the priority selection scheme comprises selecting the control quantity generated by the pitch-angle closed control loop during the ground operating mode and the transition from the ground operating mode to the flight operating mode.

16. The control method according to claim 13, wherein determining the value of the reference pitch angle comprises:
- determining a first reference value for the pitch angle based on a signal indicative of an input power request and a further signal indicative of the engagement or disengagement of the mechanical lock; and
- implementing a rate-limitation of the first reference value, thereby generating a second reference value for the pitch angle, to be supplied as said reference pitch angle.

17. The control method according to claim 16, wherein implementing the rate-limitation comprises automatically tuning the rate-limitation according with environmental and/or engine conditions, including altitude and temperature, in order to ensure a monotonic propeller speed increase during the transition from the ground operating mode to the flight operating mode.

* * * * *